Dec. 24, 1968                     J. LUC                   3,418,196
METHOD OF SEALING MATERIALS TOGETHER BY A RUBBING TREATMENT
AND ARTICLES PRODUCED THEREBY
Filed Feb. 18, 1964
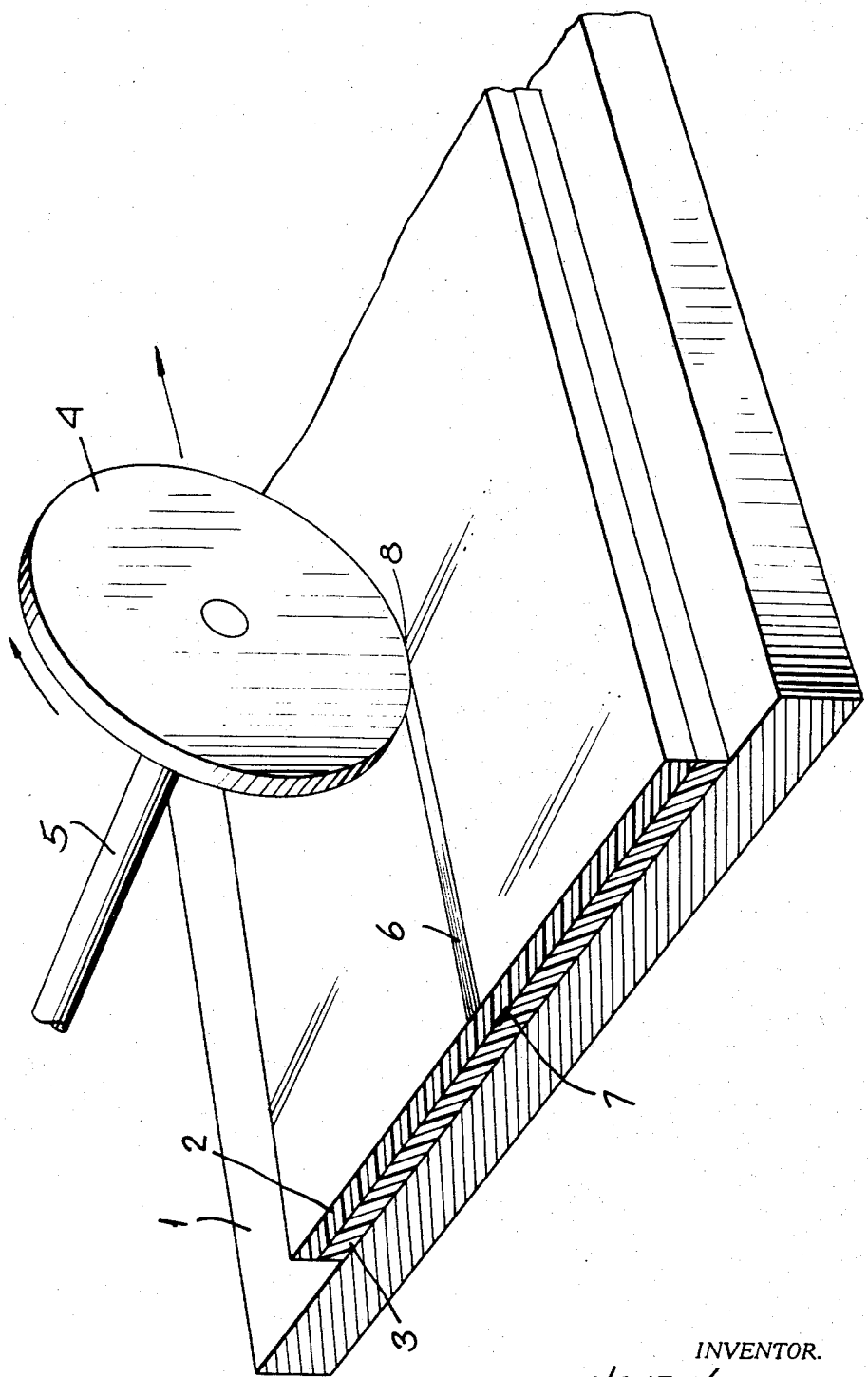
INVENTOR.
JANE LUC
BY
ATTORNEY United States Patent Office 3,418,196
Patented Dec. 24, 1968

3,418,196
METHOD OF SEALING MATERIALS TOGETHER BY A RUBBING TREATMENT AND ARTICLES PRODUCED THEREBY
Jane Luc, 17 Blvd. Clemenceau, Strasbourg, Bas-Rhin, France
Filed Feb. 18, 1964, Ser. No. 345,561
Claims priority, application Great Britain, Feb. 22, 1963, 7,326/63; June 25, 1963, 25,265/63; Oct. 8, 1963, 39,675/63
19 Claims. (Cl. 161—38)

ABSTRACT OF THE DISCLOSURE

A process of sealing or laminating a plurality of materials superimposed on one another and comprising a sealable plastic material, the process comprising the steps of, forming an assembly of superimposed materials comprising a sealable plastic material and, rubbingly contacting a surface of the assembly with at least sufficient pressure to insure that the superimposed materials in the assembly touch one another in the areas of the contact, and wherein the rubbing movement is at a relative speed about equivalent to a 1 inch diameter wheel rotating at least several hundred revolutions per minute, thereby causing materials capable of being sealed which are in contact with one another in the assembly to seal in the areas of the contact.

Description of the invention

This invention relates to improvements in adhesive processes and in products obtained thereby.

Many materials present considerable difficulty when it is desired to laminate them, seal them. Notable amongst these are the hydrophobic plastic materials such as polyethylene, polyprophylene, polystyrene and other polyolefines; polyvinyl chloride, polymers or copolymers of vinylidene chloride, the hydrophobic acrylic resins such as polyacrylonitrile and also metals and vitreous materials or materials with a vitreous finish such as glass fused silica and ceramic materials.

Lamination or sealing of the plastic materials usually involves the use of specially prepared adhesives or the application of heat sufficient to melt or soften the plastic thus giving rise to surface or volume distortion and deterioration of the surface appearance.

One very important method of treatment according to the present invention consists in rubbing the surface which is required to develop adhesive properties.

In practice the rubbing which inherently creates friction may be applied by suitable mechanical devices, for example by rapidly rotating brushes, by felt, hard rubber or silicone wheels or by a series of such wheels or by rollers or travelling bands brought into contact with the film, sheet or other material under treatment. The extent of the modification brought about by the treatment may be varied by varying the speed of the frictioning device relative to the film, sheet etc., the pressure it exerts against the film, sheet or the like and the tension under which the latter is held. Using for example small wheels of about 1 inch diameter for sealing along a line, the speed of the wheel may be varied from several hundred r.p.m. to 20000–30000 r.p.m. or more. Similarly the pressure at which the friction is applied may be varied from a mere light contact, useful in sealing the overwrap enveloping a fragile or readily deformable package or article, to a pressure of several pounds. Sealing or lamination of thin film may be effected under the lightest pressure consistent with obtaining contact. Generally speaking, to obtain a given strength of seal or lamination, speed and pressure are interdependent. A further variable is the base against which the sealing or lamination is carried out. A polytetrafluoroethylene base, for example, usually requires different conditions of speed and/or pressure from those required by a metal-base to produce the same degree of adhesion.

For sealing along a fine line, the friction may be applied by means of a wire or thread, light or heavy pressure being applied by means of a grooved rotating wheel or grooved jig, the films to be sealed being led into the groove between the wire or thread and the wheel or jig.

As stated above, the improved adhesive characteristics can be obtained by direct frictional treatment of the surface or by applying the rubbing treatment through an intermediate layer of a material, such as uncoated regenerated cellulose film or polytetrafluorethylene film, which is resistant to adhesion. For many purposes the latter alternative is preferable since it serves at the same time to protect the surface being treated.

Thus, in accordance with the said process two films of polyethylene, of polypropylene or of saran wrap may be assembled, covered with a film or sheet of cellophane and rubbed through that cellophane to secure adhesion of the polymer films. In some cases the laminate so produced acquires a higher polish than it had before treatment, possibly by a filling of the "pores" of the surface. Heat is not necessary to obtain the adhesion effect but in some cases it is of advantage to rest the assembly on a hot plate or a cold plate or to pre-heat or pre-cool the material in some other way. In other cases the process may be carried out using a metal plate, e.g. a condenser plate, charged to a high potential as a backing plate for the films. An A.C. or D.C. potential of upwards of 1000 volts may be used, and preferably of the order of 5000 volts.

If desired the film or one of the films undergoing lamination may be textured or decorated simultaneously, for example by placing an embossed or textured material under or over the polyethylene, polypropylene or similar film undergoing welding or lamination. A decorative finish corresponding with the embossed or textured material is imparted to the film. An embossed effect of this character may extend through an assembly of films or may be prevented from so doing by interposing a comparatively rigid film between the film or films which are to receive the emboss and that or those which are to remain flat. By using a deeply embossed backing, lamination may take place only at the points or areas corresponding with the high spots of the embossing surface.

Further the lamination process may have the effect of rendering polyethylene, which is normally cloudy, transparent. This effect can be particularly attractive when the rubbing is carried out locally, according to a particular pattern, e.g. on an embossing surface. One of the films may be previously coated or printed and then subjected to the process in contact with a clear film. In some cases the two films become laminated together and in others only a thin layer of the coated or printed film or only the print or coating itself is laminated or transferred to the clear film. Further one of the films may be replaced by paper, cardboard or textile material.

Among the materials which may be treated according to the present invention are polyethylene, polypropylene, polystyrene and other polyolefins; polyvinyl chloride, polymers and copolymers of vinylidene chloride and the hydrophobic acrylic resins such as polyacrylonitrile and polymethylmethacrylate. Other materials include polytetrafluoroethylene, fluorinated ethylene-propylene copolymer, high density polyethylene, e.g. in the form of tubing, heavy duty polyethylene sheet, coated or uncoated polyester film (polyethylene terephthalate), polyamides, polyurethanes, cellulose acetate, paper (including cardboard, regenerated cellulose film and glass fibre. Such materials may be uncoated or may be previously coated with suitable compositions. It is further possible to work with incompletely cured cross-linking resins, for example urea-formaldehyde and melamine-formaldehyde resins and also to complete the curing simultaneously with the present processes or continuously therewith. It is usually advisable to employ resins which are condensed beyond the water-soluble stage and have reached a solvent-soluble state wherein they exhibit considerable cohesion.

Laminates may be made up of two or more films or sheets, foamed or not, of the above materials, the individual layers of the laminates being made of the same or different polymer or other base. The invention is particularly adapted to laminating paper or thin cardboard to plastic foams or to plastic films, e.g. of polyolefins, materials which normally adhere only with great difficulty and with the aid of specially formulated adhesives. In making laminates of polyolefins or similar extrudable plastic materials with paper, thin cardboard or other material resistant to the hot melt, such plastic material may be extruded directly onto the layer to which it is to be laminated and the present process then applied, preferably in one continuous run, to the assembly so produced. Further the coating of plastic can be simultaneously textured, for example by pressing against a non-adherent textile fabric or other patterned material. Due to the adhesive effect of the invention being transmitted through a considerable thickness of material, the invention may be used to laminate or weld together quite thick materials, including the parts of plastic joints or plastic and metal joints.

The invention is also applicable to the lamination or welding of synthetic textile fabrics, e.g. of nylon, polyester of polyacrylonitrile, to films, sheets or foams or to other fabrics which may be made of natural or synthetic fibres. One particular application of the fabric-to-fabric or fabric-to-film laminates is for semi-stiff collars or semi-stiff fabrics for use in tailoring. Here the practice is to make an assembly comprising a fabric or film made of a soluble or fusible material with a top layer of cotton fabric or fabric of other natural fibre or sandwiched between two such layers and to laminate by means of solvents or heat. Neither solvents nor heat are necessary according to the present invention.

Inserts, such as metal, wire, threads or metallic or other particles, may be embedded in the surfaces of the particles, may be embedded in the surfaces of the materials or may be included in the laminates, seals or the like produced according to the invention. Such inserts may be purely decorative or may be utilitarian, e.g. by using metallic or carbon particles an electrically conducting layer may be formed; including a thin metal wire or strong thread in a seal provides a ready means of opening the seal; or by laminating a series of wires or threads to a plastic band a robust tear-strip may be provided for use with heavy-packages.

When using a rotating tool for effecting sealing of two or more layers of material, it is a simple matter to effect a simultaneous cutting of the layers within or adjacent to the seal. For example when using the edge of a disc polisher to produce the friction, a slight tilt applied to the tool serves to sever and seal the edges of the material. Alternatively the tool may be provided with a cutting edge to one side of the frictioning surface so as to cut adjacent to the seal or the cutting edge may be within the frictioning surface so as to seal on both sides of the cut.

One of the layers to be laminated may be in the form of a hot melt extrudate or a film freshly formed from solution. Thus polyethylene is notoriously difficult to laminate to paper or the like, even though the latter be previously coated with adhesive. In accordance with the present invention, the hot melt film may be covered with the paper or the like to be laminated thereto and the paper or the like covered with a layer of polytetrafluoroethylene and/or uncoated regenerated cellulose and the whole subjected to a friction treatment applied, e.g. by a rapidly rotating roller, to the last mentioned layer.

In order to more fully describe the invention reference is made to the drawing which shows a sketch of the practise of one embodiment of the process of this invention. The drawing is provided by way of illustration and not by way of limitation.

In the figure there is shown working table surface 1 upon which the assembly comprising plastic sheets 2 and 3 rest superimposed on one another. High speed rotating wheel 4 is shown on partial drive shaft 5. (Driving mechanism not shown). High speed rotating wheel 4 is in rubbing contact with plastic sheet 2 at contact point 8. As high speed rotating wheel 4 is moved along the surface of sheet 2, seal line 6 is formed and the resulting seal between sheets 2 and 3 is indicated by the numeral 7. Although high speed rotating wheel 4 is indicated as rotating in a clockwise direction, this is optional. It may likewise be rotated in the reverse direction while still being moved across surface of sheet 2 in the same direction as shown. Of course, the width of the wheel can vary in accordance with the width of seal desired.

The following examples illustrate the invention. In all cases where the constituents of an assembly are listed, the list begins at the bottom layer, and gives the materials in the order of assembly.

Example I

A film of regenerated cellulose is placed over the two films of polyethylene. A motor driven felt polishing head rotating at 25,000 r.p.m. is drawn over the cellophane which remains unaffected by the treatment. The underlying polyethylene films are sealed or laminated together. The rubbing treatment may be localized along predetermined lines or in areas to produce a pattern or uniformly over the entire area. With a Dremel polishing machine a speed of passage over the cellophane of about 3 metres a minute gives very good results but faster speeds may be used if the motor speed is reduced. The pressure can be quite light with thin films but a slight increase in pressure is desirable when laminating or sealing heavier film or sheeting and the exact pressure may also depend upon the molecular weight of the polymer constituting the film.

Example II

Example I is repeated, replacing the lower layer of polyethylene by cardboard or a textile material, using a motor speed of 27,000 r.p.m. and reducing the rate of passage over the assembly to 150 cms. per minute while exerting some pressure.

Example III

Example I is again repeated, replacing the polyethylene film by thin vinyl film (saran wrap). The same type of treatment may be applied for laminating comparatively thick polyvinyl chloride films, e.g. 0.2 mm. thick.

Example IV

Regenerated cellulose provided with a coating for waterproofing and similar purposes is placed on top of a cellulose acetate film and subjected to treatment with the polishing machine which rotates at 27,000 r.p.m. and is drawn over the assembly at about 150 cms. per minute. The two become laminated together.

Example V

An assembly is made up as follows:

(a) a metal backing plate carrying a criss-cross pattern in relief or a plain metal backing plate with a superimposed thin metal grill;
(b) a layer of coloured polyethylene film
(c) two layers of uncoloured polyethylene film
(d) a layer of regenerated cellulose film.

A felt polishing head rotating at 27,000 r.p.m. is passed over the top layer at a speed of 150 cms. per minute and under some pressure and as a result the three polyethylene films are laminated together so as to appear as a single coloured film carrying an emboss corresponding with the relief pattern or grill of the backing surface, the high spots of the emboss being markedly more transparent than the remainder.

Example VI

The assembly is composed as follows:

(a) a metal backing plate
(b) a coloured sheet of cellulose acetate
(c) two films of cast polypropylene
(d) a film of regenerated cellulose.

Friction is from a felt or rubber polishing head rotating at 27,000 r.p.m. passed over the assembly at 150 cms. per minute under light pressure. Some of the upper surface of the coloured cellulose acetate is transferred to the lower surface of the two films of case polypropylene which are simultaneously laminated.

Example VII

The assembly is composed of:

(a) some type of soft backing plate covered by a film of regenerated cellulose
(b) two layers of oriented polypropylene
(c) a printed film of regenerated cellulose with the printed surface placed next to the polypropylene film.

The print is transferred to the film of polypropylene during friction on the surface of the top layer.

Example VIII

The assembly is composed of:

(a) a backing surface;
(b) a film of regenerated cellulose if the backing surface is not a metal;
(c) two films of polyethylene;
(d) a film of regenerated cellulose;
(e) two films of polyethylene;
(f) a film of regenerated cellulose;
(g) two films of polyethylene;
(h) a film of regenerated cellulose.

A felt wheel rotating at a speed of approximately 27,000 r.p.m. is passed over the surface in a straight line at a linear speed of 150 cms per minute and under a pressure of 100–200 gms. per sq. cm. All three pairs of polyethylene film are sealed separately.

Example IX

The assembly is composed of:

(a) a backing surface;
(b) a film of regenerated cellulose if the surface is not a metal and if lamination to it is not desired;
(c) two films of cast polypropylene;
(d) two films of polyethylene;
(e) two films of oriented polypropylene;
(f) a film of regenerated cellulose.

A felt wheel is passed over the surface under the conditions of Example VIII above. Sealing occurring between similar films, but not between dissimilar films.

Example X

Fair adhesion has been observed between dissimilar plastics in the following assembly:

(a) a backing plate;
(b) an oriented polypropylene film
(c) two layers of polyethylene film
(d) an oriented polypropylene film
(e) a film of regenerated cellulose.

A felt wheel is rotated at approximately 27,000 r.p.m. and drawn across the surface of the assembly at a speed of about 2.5 cms. per second. Firm adhesion is noted particularly of the lower oriented polypropylene film to the polyethylene, which is also sealed to itself.

In all these examples, decrease of load may be compensated by increase of motor speed of the felt wheel or similar rubbing means and at a speed of 27,000 r.p.m. little or no pressure at all is necessary for sealing, the polishing head simply being brushed over the surface.

Example XI.—A cast polypropylene and fiber glass laminate

An assembly is made up as follows:

(a) a backing material such as polyester sheet.
(b) a film of cast polypropylene
(c) a web of woven fiber glass
(d) a film of cast polypropylene
(e) a sheet of architect's drawing cloth. (Polyester impregnated.)

A Dremel felt polishing head rotating at 25,000 r.p.m. is passed at about 75 cms. per minute and under some pressure (about 70 gms. per sq. cm.) over the architect's drawing cloth. The woven fiber glass is laminated between the two films of cast polypropylene.

Example XII.—A composite wood, plastic, paper, plastic laminate

An assembly is made up as follows:

(a) a piece of plywood.
(b) a film of polyethylene.
(c) a sheet of paper
(d) a film of oriented polypropylene.
(e) a film of regenerated cellulose.

The felt polishing head rotating at 25,000 r.p.m. is passed several times over the assembly at a linear speed of 50 cms. per minute and under a pressure of some 100–200 gms. per sq. cm.

Example XIII.—A composite paper, textile, plastic laminate

An assembly is made up as follows:

(a) a sheet of polytetrafluoroethylene
(b) a sheet of paper
(c) one thickness of shirinkable oriented polypropylene film
(d) a woven fabric of polypropylene yarns or monofils.
(e) a second thickness of shrinkable oriented polypropylene film
(f) a film of regenerated cellulose.

The felt polishing head is passed over the assembly as described in Example II and the paper, polypropylene fabric, and oriented polypropylene films are laminated together.

Example XIV.—A brass wire inset into polyethylene

An assembly is made up as follows:

(a) a backing sheet of polytetrafluoroethylene
(b) three sheets heavy duty polyethylene film
(c) a brass wire inset
(d) three sheets of heavy duty polyethylene film
(e) a film of regenerated cellulose The felt polishing head, set to a speed of about 25,000 r.p.m., is passed several times over the assembly as described in Example II until the plastic sheets are welded together and the wire enclosed or potted therein.

Example XV.—Polishing a sheet of polymethylmethacrylate

The assembly consists simply of:
(a) a sheet of polymethylmethacrylate
(b) a film of regenerated cellulose A conical felt polishing head rotating at 27,000 r.p.m. is moved to and fro across the assembly at a linear speed of 75 cms. per minute and under light pressure until the whole area is covered thereby polishing the surface of the plastic.

Many other types of plastic material may be polished using this method. If desired solid particles may be sandwiched between the regenerated cellulose and the surface to be polished and as a result of the polishing and of applied pressure become embedded in the plastic surface.

Example XVI.—A matt finish given to a sheet of cellulose acetate

An assembly is made up as follows:
(a) a sheet of polytetrafluoroethylene as a backing material
(b) a sheet of cellulose acetate
(c) a fabric of coarse natural fibre yarns, e.g. of cotton
(d) a film of regenerated cellulose The felt polishing head rotating at 27,000 r.p.m. is moved over the assembly at about 75 cms. per minute under light pressure in a series of parallel lines. A textile finish is thereby imparted to the cellulose sheet.

In a similar way matt or other finishes may be imparted to other plastic materials.

Example XVII.—Bonding of textiles

An assembly is made up as follows:
(a) a sheet of polytetrafluoroethylene as a backing material
(b) a nylon fabric
(c) a nylon fabric
(d) a film of regenerated cellulose A hard felt polishing head rotating at 27,000 r.p.m. is moved over the assembly at about 150 cms. per minute and under light pressure whereby the two nylon textile materials are welded together. The method may be used for laminating dissimilar textiles, e.g. for forming laminates of natural and synthetic textile fabrics.

Example XVIII.—Polystyrene foam-paper lamination

An assembly is made up as follows:
(a) a metal plate
(b) a sheet of decorative polystyrene foam
(c) a thin sheet of paper
(d) a film of regenerated cellulose A soft felt head is placed on the Dremel polisher which is set to rotate at 20,000 r.p.m. The head is then passed at high speed (300 cms. per minute) but low pressure over the assembly. The paper becomes laminated to the polystyrene foam without any noticeable changes in the foam composition.

Example XIX.—Polyurethane foam-polyester film laminate

An assembly is made up as follows:
(a) a metal plate
(b) a section of polyurethane foam
(c) a polyester film
(d) a film of regenerated cellulose A hard felt head rotating at 25,000 r.p.m. is passed under light pressure over the assembly at a linear speed of 75 cms. per minute. The polyester film is welded to the foam.

Example XX

Two thicknesses of biaxially oriented isotactic polypropylene film are placed one above the other and rubbed by a motor driven silicone polishing wheel driven at 25,000 r.p.m. and drawn over them with a light contact at a speed of 7.5 cms. per second while they are supported on an aluminium plate. The two films are sealed or welded together over the whole rubbed area. In contrast with the ordinary heat-sealing process, there is little or no tendency of the films to wrinkle in the areas of sealing.

Example XXI

Polypropylene film as used in Example XX is placed on a fabric woven from polypropylene fibre. A felt polishing wheel is drawn over the assembly as described in Example XX and causes welding of the film to the fabric.

Example XXII

Two thicknesses of biaxially oriented isotactic polypropylene film are placed one above the other and rubbed by a motor-driven silicone polishing wheel driven over them while they are supported on an aluminium plate. The two films are sealed or welded together over the whole rubbed area. In contrast with hte ordinary heat-sealing process, there is little or no tendency of the films to wrinkle in the areas of sealing.

Example XXIII.—Lamination of uncoated celophane to polyester foam

The assembly is composed of:
(a) a metal plate
(b) polyester foam
(c) uncoated cellophane film.

A soft felt wheel revolving at approximately 30,000 r.p.m. is passed over the cellophane, causing it to adhere to the polyester foam.

If a large area is to be laminated, the felt wheel is replaced by a rapidly revolving felt covered roller.

Example XXIV.—The lamination of uncoated cellophane to "saran" (P.V.C.) foil

The assembly is composed of:
(a) a thick sheet of Teflon (tetraflouroethylene fluorocarbon resins including fluorinated ethylene-propylene resins.)
(b) a film of saran wrap.
(c) a film of uncoated cellophane.
(d) a film of uncoated cellophane.

A soft felt wheel revolving at approximately 30,000 r.p.m. applies friction to the upper film of cellophane, laminating the lower film to the saran wrap.

The same assembly can be used to obtain some adhesion between a nylon film or polyester film and cellophane, but increased pressure and speed is necessary.

It will be understood that the Abstract of Disclosure is included in this specification solely for the purposes of Rule 72(b) of the Rules of Practice of the United States Patent Office.

We claim:
1. The process of sealing or laminating a plurality of materials superimposed on one another and comprising a sealable plastic material, said process comprising the steps of:
    (1) forming an assembly of superimposed materials comprising a sealable plastic material; and,
    (2) rubbingly contacting a surface of said assembly with at least sufficient pressure to insure that said superimposed materials in said assembly touch one another in the areas of said contact, and wherein the rubbing movement is at a relative speed about equiv- alent to a 1 inch diameter wheel rotating at least several hundred revolutions per minute, thereby causing materials capable of being sealed which are in contact with one another in said assembly to seal in said areas of said contact.

2. A process according to claim 1, wherein an insert is simultaneously sandwiched within the sealed area.

3. A process according to claim 1, wherein, in forming a laminate, at least one of the surfaces of the laminate is simultaneously embossed by pressure contact against a non-planar material.

4. A process according to claim 1, wherein sealing takes place while the assembly is in pressure contact with a deeply embossed backing, whereby sealing is effected at places corresponding with the peaks of the embossed backing.

5. Process according to claim 1, wherein sealable plastic material is brought to the assembly point in the form of a hot melt extrudate.

6. A process according to claim 1, wherein said assembly is simultaneously cut.

7. A process according to claim 1, wherein an electrostatic charge is applied to the material undergoing rubbing contact.

8. A process according to claim 1, wherein the rubbing contact is applied to the material in a high intensity electric field.

9. The process of claim 1 including, prior to said rubbing contact step, the step of forming an assembly comprising said superimposed materials comprising a sealable plastic material and a material highly resistant to adhesion to said first mentioned material, wherein said rubbing contact is on the surface of said highly resistant material of said assembly.

10. The process of claim 9, wherein said highly resistant material is uncoated regenerated cellulose.

11. The process of claim 9 including, prior to said rubbing contact step, forming in series, a plurality of assemblies of said materials separated from each other by material highly resistant to adhesion to said first mentioned material.

12. The process of claim 11 wherein said highly resistant material is uncoated regenerated cellulose.

13. The process of claim 9 wherein said surface is rubbed by means of a relatively high speed rotating friction member.

14. The process of claim 11 wherein said surface is rubbed by means of a relatively high speed rotating friction member.

15. The product of the process of claim 1.
16. The product of the process of claim 9.
17. The product of the process of claim 2.
18. The product of the process of claim 11.

19. The process of sealing a plurality of layers of material comprising hydrophobic plastic material, comprising the step of relatively lightly rubbing a surface of said material with a rotating friction member, the relative speeds between said material and said member being about equivalent to a 1 inch diameter wheel rotating at least several hundred revolutions per minute.

References Cited

UNITED STATES PATENTS

| | | |
|---|---|---|
| 2,737,764 | 3/1956 | Lewis. |
| 1,731,390 | 10/1929 | Mitchell _____ 228—2 |
| 2,032,271 | 2/1936 | Enghauser _____ 29—470.3 |
| 2,457,659 | 12/1948 | Graham et al. _____ 156—380 |
| 2,633,894 | 4/1953 | Carwile _____ 156—73 |
| 2,801,949 | 8/1957 | Bateman _____ 156—247 |
| 2,733,180 | 1/1956 | Pinto _____ 156—209 |
| 3,265,551 | 8/1966 | Ananian et al. ____ 156—273 X |
| 2,404,073 | 7/1946 | Karfiol et al. _____ 156—209 |
| 2,579,589 | 12/1951 | Lehmberg. |

FOREIGN PATENTS

| | | |
|---|---|---|
| 572,989 | 10/1945 | Great Britain. |
| 250,121 | 3/1959 | Japan. |

PHILIP DIER, *Primary Examiner.*

U.S. Cl. X.R.

161—44, 214, 252; 156—73, 209, 244, 251, 580, 247; 29—470.1

UNITED STATES PATENT OFFICE
CERTIFICATE OF CORRECTION

Patent No. 3,418,196    Dated December 24, 1968

Inventor(s)    JANE LUC

It is certified that error appears in the above-identified patent and that said Letters Patent are hereby corrected as shown below:

In the Specification
Column 1, line 39 delete "polyprophylene" and insert therefor --polypropylene--; Column 1, line 44 after "glass" insert --,--. Column 2, line 8 delete "fraction" and insert therefor --friction--: Column 3, line 4 after "board" insert --)--; Column 3, lines 50 and 51 delete "may be embedded in the surfaces of the particles,". Column 8, line 27 delete "hte" and insert therefor --the--; Column 8, line 31 delete "celophane" and insert therefor --cellophane--.

In the Claims
Column 8, line 65 delete "sealing or laminating a plurality" and insert therefor --making a laminae--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents